US009528913B2

(12) United States Patent
Heda et al.

(10) Patent No.: US 9,528,913 B2
(45) Date of Patent: Dec. 27, 2016

(54) METHOD AND SYSTEMS FOR DETECTION OF COMPRESSOR SURGE

(71) Applicant: General Electric Company, Schenectady, NY (US)

(72) Inventors: Sanjeev Shyam Heda, Kennesaw, GA (US); Steven William Backman, Simpsonville, SC (US); Matthew John Mckeever, Greer, SC (US); Scott Alan Wood, Suwanee, GA (US); Carlo Angelo Yon, Atlanta, GA (US); Robert Joseph Iasillo, Atlanta, GA (US); Christopher Childs, Marietta, GA (US)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 14/340,289

(22) Filed: Jul. 24, 2014

(65) Prior Publication Data

US 2016/0025596 A1    Jan. 28, 2016

(51) Int. Cl.
*G01M 15/14* (2006.01)
*F01D 21/00* (2006.01)
*G05B 23/02* (2006.01)

(52) U.S. Cl.
CPC ............ *G01M 15/14* (2013.01); *F01D 21/003* (2013.01); *G05B 23/0232* (2013.01)

(58) Field of Classification Search
CPC .................................................... G01M 15/14
USPC ................ 73/112.01, 112.03, 112.05, 112.06
See application file for complete search history.

(56) References Cited

U.S. PATENT DOCUMENTS

| 2,693,081 | A |   | 11/1954 | Russ |
|---|---|---|---|---|
| 3,047,210 | A |   | 7/1962 | Best |
| 3,424,370 | A |   | 1/1969 | Law |
| 3,555,844 | A |   | 1/1971 | Fleckenstein et al. |
| 3,868,625 | A |   | 2/1975 | Speigner et al. |
| 3,963,367 | A |   | 6/1976 | Stalker et al. |
| 4,137,710 | A |   | 2/1979 | Preti et al. |
| 4,259,835 | A | * | 4/1981 | Reed ........................ F02C 9/28 60/39.281 |

(Continued)

OTHER PUBLICATIONS

European Search Report and Opinion issued in connection with corresponding EP Application No. 15177609.3 on Dec. 15, 2015.

*Primary Examiner* — Eric S McCall
(74) *Attorney, Agent, or Firm* — Armstrong Teasdale LLP

(57) ABSTRACT

A system for remote detection of surge in a fleet of turbine engines includes an on-site monitoring device coupled to each turbine engine of the fleet of turbine engines. The on-site monitoring device is configured to continuously receive operating parameter measurements indicative of operational and thermodynamic conditions of the turbine engine. The operational condition includes a compressor exit condition of the turbine engine compressor. The on-site monitoring device is configured to compile and transmit a snapshot of the operating parameter measurements to a remote monitoring unit. The remote monitoring unit is positioned remote from each turbine engine of the fleet of turbine engines. The remote monitoring unit is configured to receive the snapshot of operating parameter measurements from the on-site monitoring device. The remote monitoring unit is further configured to detect surge in the turbine engine based on analysis of the snapshot of operating parameter measurements.

20 Claims, 3 Drawing Sheets

(56) References Cited

U.S. PATENT DOCUMENTS

| | | | |
|---|---|---|---|
| 4,363,596 A | 12/1982 | Watson et al. | |
| 4,505,150 A * | 3/1985 | Seymour | F02C 9/28 |
| | | | 374/144 |
| 4,545,198 A | 10/1985 | Yoshida | |
| 4,581,900 A | 4/1986 | Lowe et al. | |
| 4,594,050 A | 6/1986 | Gaston | |
| 4,594,051 A | 6/1986 | Gaston | |
| 4,618,856 A * | 10/1986 | Antonazzi | G01L 9/12 |
| | | | 340/626 |
| 4,662,817 A | 5/1987 | Clark et al. | |
| 4,940,391 A | 7/1990 | Elms et al. | |
| 5,070,537 A | 12/1991 | Ohira et al. | |
| 5,224,452 A | 7/1993 | Tomizawa | |
| 5,306,116 A | 4/1994 | Gunn et al. | |
| 5,402,632 A | 4/1995 | Nobre et al. | |
| 5,572,116 A | 11/1996 | Kurasawa et al. | |
| 5,726,891 A * | 3/1998 | Sisson | F04D 27/001 |
| | | | 415/17 |
| 5,767,780 A | 6/1998 | Smith et al. | |
| 5,838,526 A | 11/1998 | Ishikawa et al. | |
| 5,894,736 A | 4/1999 | Beaverson et al. | |
| 5,913,248 A | 6/1999 | Harada et al. | |
| 5,971,712 A | 10/1999 | Kann | |
| 5,986,462 A * | 11/1999 | Thomas | G01R 31/008 |
| | | | 324/73.1 |
| 6,031,705 A | 2/2000 | Gscheidle | |
| 6,259,371 B1 | 7/2001 | Chang | |
| 6,298,718 B1 * | 10/2001 | Wang | F02D 41/0007 |
| | | | 701/100 |
| 6,354,806 B1 | 3/2002 | Bingham, Jr. | |
| 6,404,348 B1 | 6/2002 | Wilfong | |
| 6,438,484 B1 * | 8/2002 | Andrew | F04D 27/02 |
| | | | 340/966 |
| 6,513,333 B2 | 2/2003 | Sugitani | |
| 6,585,663 B1 | 7/2003 | Coley et al. | |
| 6,597,180 B1 | 7/2003 | Takaoka et al. | |
| 6,823,254 B2 | 11/2004 | Faymon et al. | |
| 7,065,973 B2 | 6/2006 | Rowe | |
| 7,072,457 B2 | 7/2006 | Brown et al. | |
| 7,396,604 B2 | 7/2008 | Rainville | |
| 7,424,823 B2 * | 9/2008 | Teolis | G01M 15/14 |
| | | | 73/112.01 |
| 2005/0096873 A1 * | 5/2005 | Klein | G01H 1/006 |
| | | | 702/184 |
| 2009/0024295 A1 * | 1/2009 | Swenson | G01F 9/02 |
| | | | 701/100 |
| 2010/0117859 A1 * | 5/2010 | Mitchell | F01D 17/02 |
| | | | 340/870.16 |
| 2010/0257838 A1 | 10/2010 | Mazzaro et al. | |
| 2010/0296914 A1 | 11/2010 | Staroselsky et al. | |

* cited by examiner

METHOD AND SYSTEMS FOR DETECTION OF COMPRESSOR SURGE

BACKGROUND

The field of the present disclosure relates generally to monitoring turbine engines and more specifically, to methods and systems for detecting compressor surge in turbine engines.

In some turbine engines, a compressor operates at a higher pressure ratio to achieve a higher efficiency. During operation of some turbine engines, the compressor may stall and even surge. This may occur when the pressure ratio of the compressor exceeds some critical value at a given speed of the turbine engine, resulting in a rapid reduction of compressor pressure ratio and airflow delivered to a combustor. Compressor stall results when the airflow separates from one or more of the compressor blades, and compressor surge results when the pressure ratio through the compressor increases such that the airflow separates from the compressor blades in one or more rows of the compressor.

During compressor surge, the compressor performance falls due to the inability of the compressor to handle the increased pressure ratio. The surge may occur due to a variety of reasons, such as, for example, when the inlet airflow pressure or temperature becomes distorted during normal operation of the compressor. In addition, surge may occur due to compressor damage or a malfunction of the turbine engine control system.

Some known turbine engines use local sensors and a local controller to monitor the airflow and pressure rise through the compressor in order to detect surge events. However, the additional costs associated with local controllers and sensors for a fleet of turbine engines can be prohibitive. Furthermore, the cost of the sensor and the installation of these on a fleet of turbines make it prohibitively expensive to retrofit existing turbine engines that may not have surge detection systems. In addition, the time required to penetrate a significant portion of a fleet of turbine engines would be time consuming. Accordingly, it would be desirable to implement a remote surge detection system that uses existing sensors on the turbine engine to determine when surge events are occurring on a fleet of turbine engines. Advantages of such a system are enabling the monitoring of a fleet of turbine engines to be implemented with reduced cost, and enabling rapid changes to the surge detection algorithm if necessary to increase accuracy.

BRIEF DESCRIPTION

In one aspect, a system for remote detection of surge in a fleet of turbine engines is provided. The system includes an on-site monitoring device coupled to each turbine engine of the fleet of turbine engines. The on-site monitoring device is configured to continuously receive operating parameter measurements indicative of operational and thermodynamic conditions of the turbine engine. The operational condition includes a compressor exit condition of the turbine engine compressor. The on-site monitoring device is further configured to compile and to transmit a snapshot of the operating parameter measurements to a remote monitoring unit. The remote monitoring unit is remote from each turbine engine of the fleet of turbine engines. The remote monitoring unit is configured to receive the snapshot of the operating parameter measurements from the on-site monitoring device. The remote monitoring unit is further configured to detect surge in the turbine engine based on the snapshot of the operating parameter measurements.

In another aspect, a method for remote detection of surge in a fleet of turbine engines is provided. The method includes monitoring operating parameters indicative of an operational condition and a thermodynamic condition of each turbine engine of the fleet of turbine engines. The operational condition includes a compressor exit condition. The method also includes continuously transmitting, to an on-site monitoring device, operating parameter measurements representative of the operational condition. Furthermore, the method includes compiling the operating parameter measurements into a periodic snapshot of the operating parameter measurements. In addition, the method includes transmitting, to a remote monitoring unit, the snapshot of operating parameter measurements. Also, the method includes detecting surge in each turbine engine of the fleet of turbine engines based on the snapshot of operating parameter measurements.

DETAILED DESCRIPTION

In the following specification and the claims, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
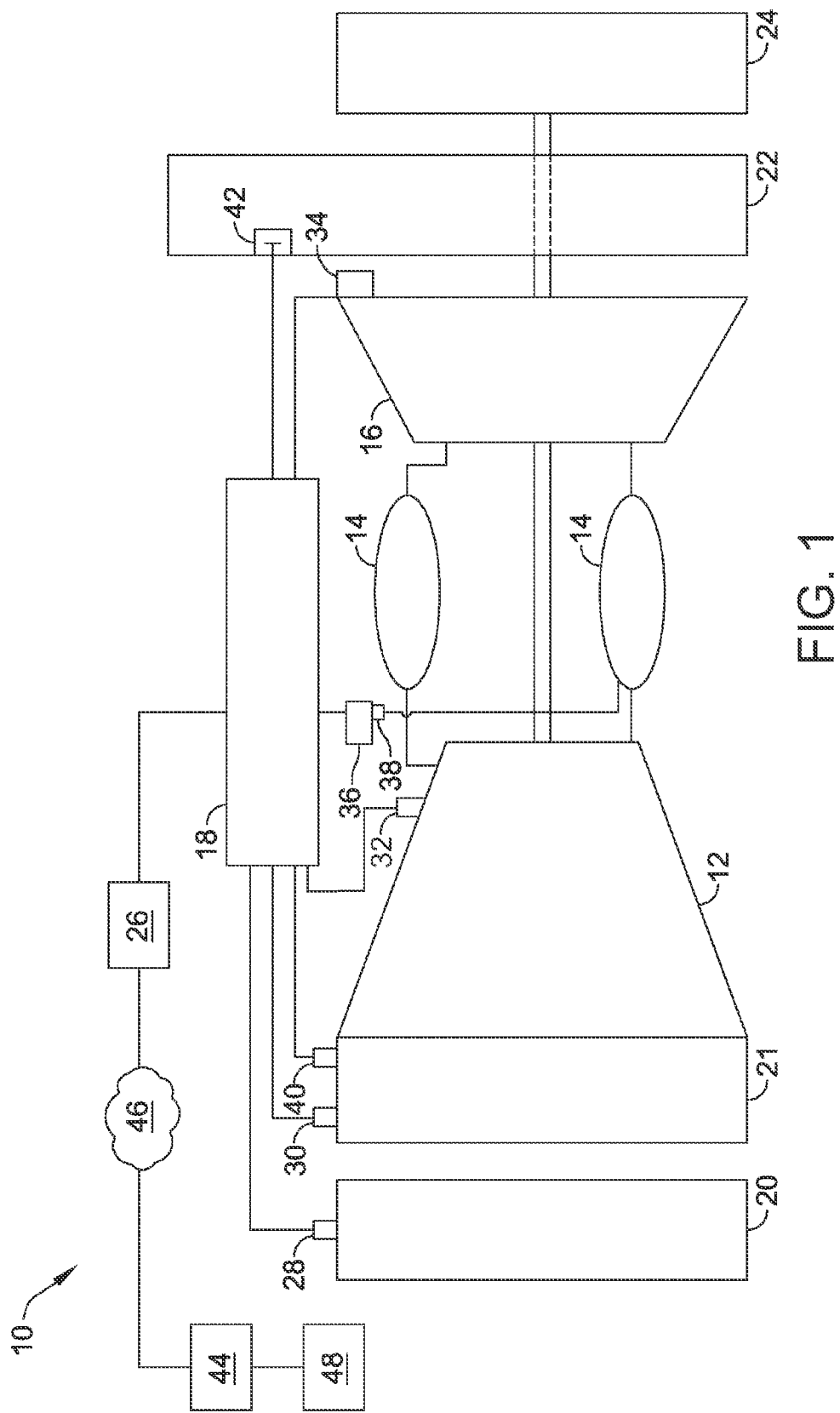
FIG. 1 is a schematic view of an exemplary gas turbine engine.

FIG. 1 is a schematic view of an exemplary gas turbine engine 10. While FIG. 1 illustrates an exemplary gas turbine engine, it should be noted that the methods and systems for detecting compressor surge described herein are not limited to any particular type of turbine engine. One of ordinary skill in the art should appreciate that the methods and systems for detecting compressor surge described herein may be used with any rotary machine, including a compressor or a steam turbine, in any suitable configuration that enables such an apparatus, system, and method to operate as further described herein.

In the exemplary embodiment, gas turbine engine 10 includes a compressor 12, a combustor 14, a turbine 16 drivingly coupled to compressor 12, a computer control system, or controller 18, and an on-site monitoring (OSM)

device 26. An inlet duct 20 coupled to compressor 12 channels ambient air and, in some instances, injected water to compressor 12. Duct 20 may include ducts, filters, screens, or sound absorbing devices that contribute to a pressure loss of ambient air flowing through inlet duct 20 and into inlet guide vanes (IGV) 21 of compressor 12. Combustion gasses from gas turbine engine 10 are directed through exhaust duct 22. Exhaust duct 22 may include sound adsorbing materials and emission control devices that induce a backpressure to gas turbine engine 10. An amount of inlet pressure losses and backpressure may vary over time due to the addition of components to inlet duct 20 and exhaust duct 22, and/or as a result of dust or dirt clogging inlet duct 20 and exhaust duct 22, respectively. In the exemplary embodiment, gas turbine engine 10 drives a generator 24 that produces electrical power.

In the exemplary embodiment, a plurality of sensors 28, 30, 32, and 34 detect various operating conditions of gas turbine engine 10 and/or the ambient environment during operation of gas turbine engine 10. For example, without limitation, sensors 28, 30, 32, and 34 may continuously monitor mechanical and/or thermodynamic parameters of gas turbine engine 10. In the exemplary embodiment, at least one pressure sensor 28 is located at inlet duct 20 of gas turbine engine 10 to enable pressure measurement changes of the inlet flow across inlet duct 20. At least one bellmouth pressure sensor 30 is located in the inlet bellmouth of gas turbine engine 10 to enable static pressure measurements of the inlet flow to be taken. At least one compressor discharge pressure sensor 32 is located at the outlet portion of compressor 12 of gas turbine engine 10 to enable pressure measurements of the compressor outlet airflow to be taken. Furthermore, at least turbine exhaust temperature sensor 34 is located at the outlet portion of turbine 16. For clarity, only one of sensors 28, 30, 32, and 34 are illustrated, however, those skilled in the art will recognize that more than one sensor can be used, i.e., that multiple redundant sensors 28, 30, 32, and 34 may be used to measure the same operating condition, respectively. Sensors 28, 30, 32, and 34 may include, without limitation, pressure sensors, temperature sensors, flame detector sensors, and/or any other device that may be used to sense various operating parameters during operation of gas turbine engine 10.

As used herein, the term "parameter" refers to characteristics that can be used to define the operating conditions of gas turbine engine 10, such as temperatures, pressures, and/or gas flows at defined locations within gas turbine engine 10. Some parameters are measured, i.e., are sensed and are directly known, while other parameters are calculated by a model and are thus estimated and indirectly known. Some parameters may be initially input by a user to controller 18. The measured, estimated, or user input parameters represent a given operating state of gas turbine engine 10.

Gas turbine engine 10, as shown in FIG. 1, further includes one or more operational sensors 42 located within the turbine to measure operational parameters associated with gas turbine engine 10. For clarity, only one operational sensor 42 is illustrated, however those skilled in the art will recognize that a typical gas turbine engine has many operational sensors located therein to measure various operating parameters, for example, without limitation, ambient temperature, compressor discharge temperature, and/or other operating temperatures of the gas stream (not shown) through gas turbine engine 10. Further, those skilled in the art will recognize that the location of sensors 42 can vary and are not limited to any one particular location. Operational sensors 42 may include, without limitation, flow sensors, speed sensors, flame detector sensors, valve position sensors, guide vane angle sensors, and/or any other device that may be used to sense various operating parameters during operation of gas turbine engine 10.

In the exemplary embodiment, a fuel control system 36 regulates an amount of fuel flow from a fuel supply (not shown) to combustor 14, an amount split between primary and secondary fuel nozzles (not shown), and an amount mixed with secondary air flowing into combustor 14. Fuel control system 36 may also select a type of fuel for use in combustor 14. Fuel control system 36 may be a separate unit or may be a component of controller 18.

Controller 18 may be a computer system that includes at least one processor (not shown) and at least one memory device (not shown) that executes operations to control the operation of gas turbine engine 10 based at least partially on control sensors 28, 30, 32, and 34 input signals, operational sensors 42 input signals, and on instructions from human operators. The controller may include, for example, a model of gas turbine engine 10. Operations executed by controller 18 may include sensing or modeling operating parameters, modeling operational boundaries, applying operational boundary models, or applying scheduling algorithms that control operation of gas turbine engine 10, such as by regulating a fuel flow to combustor 14. Controller 18 compares operating parameters of gas turbine engine 10 to operational boundary models, or scheduling algorithms used by gas turbine engine 10 to generate control outputs, such as, without limitation, a firing temperature. Commands generated by controller 18 may cause a fuel actuator 38 on gas turbine engine 10 to selectively regulate fuel flow, fuel splits, and/or a type of fuel channeled between the fuel supply and combustors 14. Other commands may be generated to cause actuators 40 to adjust a relative position of IGVs 21, adjust inlet bleed heat, or activate other control settings on gas turbine engine 10.

In the exemplary embodiment, OSM 26 is coupled in communication with controller 18 and is configured to receive data communicated from controller 18, for example, at 1 Hertz (Hz). Alternatively, OSM 26 may be configured to receive data from controller 18 at intervals greater or less than 1 Hz. Further, OSM 26 is configured to transmit data received from controller 18 to a remote monitoring unit 44 at substantially the same interval as which it receives data from controller 18.

In the exemplary embodiment, remote monitoring unit 44 is coupled in communication with OSM 26 via a communications network 46, for example, without limitation, a wired connection or a wireless connection. Communications network 46 may include the Internet or any other network capable of communicating data between devices. For example, without limitation, suitable networks may include or interface with any one or more of a local intranet, a local area network (LAN), a wide area network (WAN), a virtual private network (VPN), a digital T1, T3, E1 or E3 line, a digital subscriber line (DSL) connection, an Ethernet connection, an integrated services digital network (ISDN) line, or the like. Furthermore, communications network 46 may include communication links to any of a variety of wireless networks, including wireless application protocol (WAP), general packet radio service (GPRS), global system for mobile communication (GSM), code division multiple access (CDMA) or time division multiple access (TDMA), cellular phone networks, global positioning system (GPS), Bluetooth radio, or the like. Communications network 46 can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection.

In the exemplary embodiment, remote monitoring unit 44 receives a snapshot of sensor 28, 30, 32, and 34 measurements and operational sensors 42 measurements from OSM 26 via communications network 46, for determination of the presence of anomalies, such as compressor surge. Remote monitoring unit 44 stores the data snapshot in a historical database 48 containing historical snapshots of sensor 28, 30, 32, and 34 measurements and operational sensors 42 measurements obtained from gas turbine engine 10, as well as any other gas turbine engine located at the site of gas turbine engine 10, and historical snapshots of other gas turbine turbines operating at other locations. Historical database 48 is configured to store the historical snapshots of data for any predetermined period that enables remote monitoring unit 44 to function as described herein. For example, in one embodiment, historical database 48 is configured to receive and store the historical snapshots of data at the same frequency of data as transmitted/stored on OSM 26. Those skilled in the art will recognize that remote monitoring unit 44 can have other databases that store additional information (e.g., rules for fixing anomalies, corrective actions, etc.), or that it is possible to store this additional information and the information in historical database 48 all in one database. In the exemplary embodiment, while the snapshot of sensor 28, 30, 32, and 34 measurements and operational sensors 42 measurements is placed in historical database 48, an algorithm is executed that analyzes the snapshot of data to determine if the sensor 28, 30, 32, and 34 measurements and operational sensors 42 measurements obtained indicate any potential compressor surge events.

The algorithm executed by remote monitoring unit 44 facilitates continued monitoring and processing of the measurements of sensors 28, 30, 32, and 34 and operational sensors 42 sent by controller 18. The algorithm enables remote monitoring unit 44 to perform real-time monitoring of surge events occurring within compressor 12 of gas turbine engine 10 and any number of other gas turbine engines connected to remote monitoring unit 44. The algorithm detects and escalates an alarm when a compressor surge has believed to have occurred within gas turbine engine 10. Compressor surge can occur when the compression has completely broken down and the high pressure airflow at the exit of compressor 12 reverses flow and comes out of inlet duct 20 instead. For example, without limitation, when a compressor surge occurs, typically there are spikes in compressor discharge pressure, inlet pressure drop across inlet duct 20, and the inlet bellmouth static pressure. For more severe events, there is a concurrent increase in the mean exhaust temperature.

Figure 2:
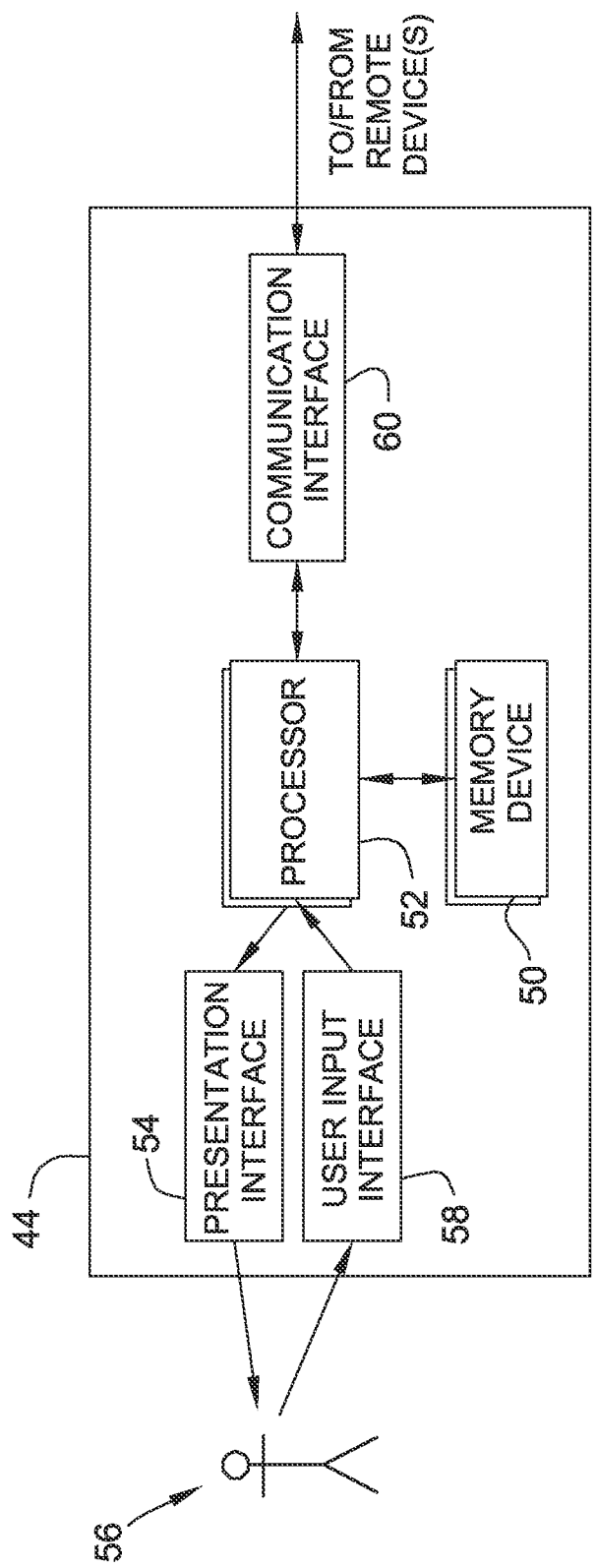
FIG. 2 is a block diagram of a remote monitoring unit that may be used to perform monitoring and processing of operating parameters of the gas turbine engine shown in FIG. 1.

FIG. 2 is a block diagram of remote monitoring unit 44 that may be used to perform monitoring of any piece of equipment, system, and process, such as, without limitation, monitoring and processing of operating parameters of gas turbine engine 10. In the exemplary embodiment, remote monitoring unit 44 includes a memory device 50 and a processor 52 that is coupled to memory device 50. Processor 52 may include one or more processing units, such as, without limitation, a multi-core configuration. In some embodiments, executable instructions are stored in memory device 50. Remote monitoring unit 44 is configurable to perform one or more operations described herein by programming processor 52. For example, processor 52 may be programmed by encoding an operation as one or more executable instructions and providing the executable instructions in memory device 50. In the exemplary embodiment, memory device 50 is one or more devices that enable storage and retrieval of information such as executable instructions or other data. Memory device 50 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

As used herein, the term "computer" and related terms, such as, "computing device", are not limited to integrated circuits referred to in the art as a computer, but rather broadly refers to a microcontroller, a microcomputer, a programmable logic controller (PLC), an application specific integrated circuit, and other programmable circuits, and these terms are used interchangeably herein.

Memory device 50 may be configured to store operational parameters including, without limitation, real-time and historical operational parameter values, or any other type of data. In some embodiments, processor 52 removes or "purges" data from memory device 50 based on the age of the data. For example, processor 52 may overwrite previously recorded and stored data associated with a subsequent time or event. In addition, or alternatively, processor 52 may remove data that exceeds a predetermined time interval. In addition, memory device 50 includes, without limitation, sufficient data, algorithms, and commands to facilitate monitoring and processing sensor measurements received from sensors coupled to a gas turbine engine including, without limitation, sensors 28, 30, 32, 34, and 42.

As used herein, the term "real-time" refers to at least one of the time of occurrence of the associated events, the time of measurement and collection of predetermined data, the time to process the data, and the time of a system response to the events and the environment.

In some embodiments, remote monitoring unit 44 includes a presentation interface 54 coupled to processor 52. Presentation interface 54 presents information, such as a user interface, to a user 56. In one embodiment, presentation interface 54 includes a display adapter (not shown) that is coupled to a display device (not shown), such as a cathode ray tube (CRT), a liquid crystal display (LCD), an organic LED (OLED) display, or an "electronic ink" display. In some embodiments, presentation interface 54 includes one or more display devices. In addition, or alternatively, presentation interface 54 includes an audio output device (not shown), for example, without limitation, an audio adapter, a speaker, or a printer (not shown).

In some embodiments, remote monitoring unit 44 includes a user input interface 58. In the exemplary embodiment, user input interface 58 is coupled to processor 52 and receives input from user 56. User input interface 58 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 54 and user input interface 58.

In the exemplary embodiment, a communication interface 60 is coupled to processor 52 and is configured to be coupled in communication with one or more other devices, such as communications network 46 and historical database 48, and to perform input and output operations with respect to such devices while performing as an input channel. For example, communication interface 60 may include, without limitation, a wired network adapter, a wireless network adapter, a mobile telecommunications adapter, a serial communication adapter, or a parallel communication adapter. Communication interface 60 may receive a data signal from or transmit a data signal to one or more remote devices. For example, in an alternative embodiment, communication interface 60 of remote monitoring unit 44 may transmit/receive a data signal to/from OSM 26.

Presentation interface 54 and communication interface 60 are both capable of providing information suitable for use with the methods described herein, such as, providing information to user 56 or processor 52. Accordingly, presentation interface 54 and communication interface 60 may be referred to as output devices. Similarly, user input interface 58 and communication interface 60 are capable of receiving information suitable for use with the methods described herein and may be referred to as input devices.

Figure 3:
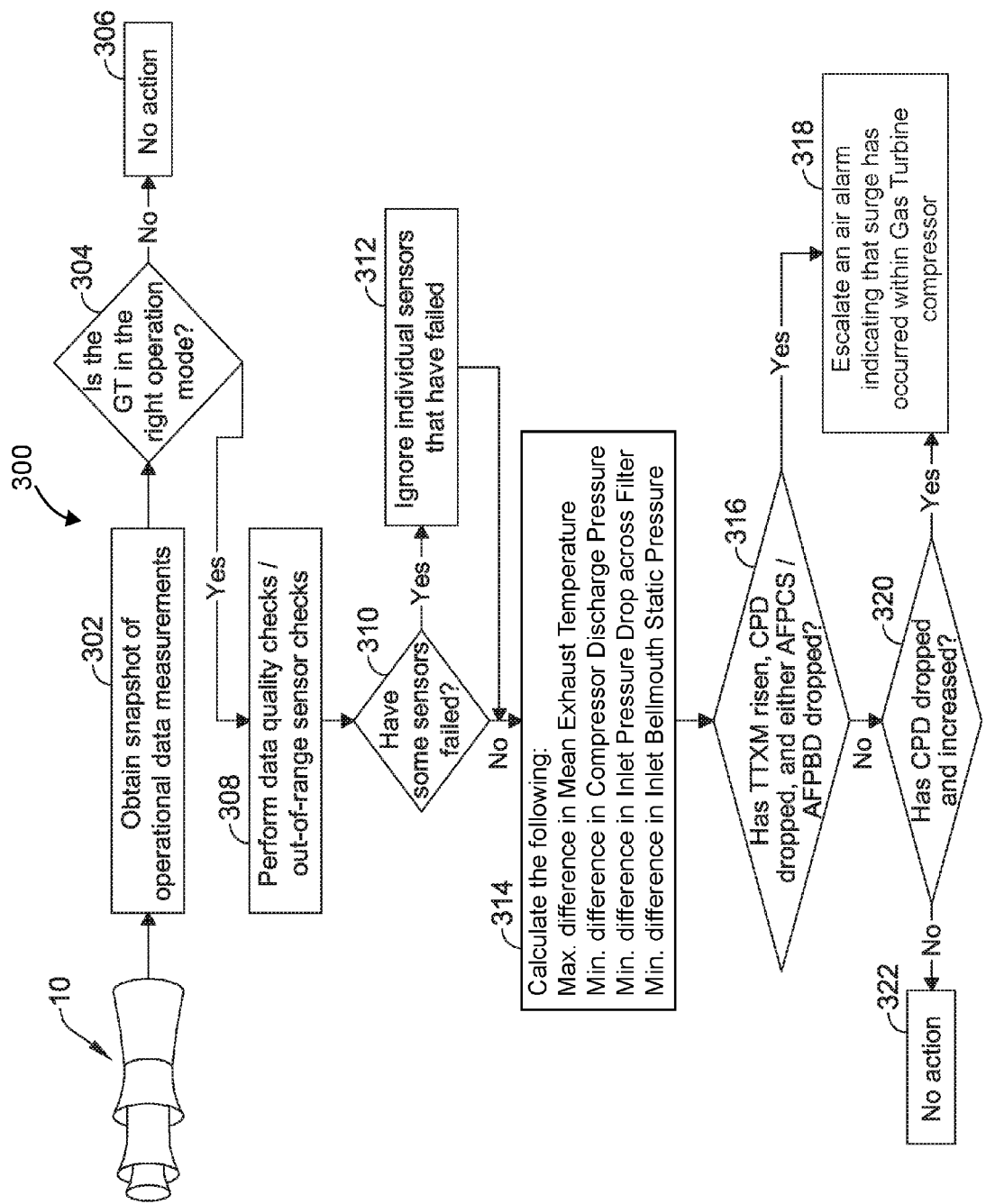
FIG. 3 is a flow diagram describing the process operations used by the remote monitoring unit shown in FIGS. 1 and 2 to detect compressor surge.

FIG. 3 is a flow diagram 300 describing the process operations used by remote monitoring unit 44 (shown in FIG. 1) to detect compressor surge. The process operations of detecting compressor surge begin at 302 by obtaining a snapshot of operational data measurements (e.g., compressor inlet conditions, compressor exit conditions, exhaust conditions, etc.) from sensors 28, 30, 32, and 34 and operational sensors 42, respectively, from gas turbine engine 10. In the exemplary embodiment, OSM 26 receives operational data measurements from sensors 28, 30, 32, and 34 and operational sensors 42, compiles the measurements into 1 Hz interval snapshots of the operational data measurements, and transmits the snapshots of operational data measurements at a 1 Hz interval to on-site monitoring unit 44 via communications network 46. Alternatively, OSM 26 transmits a snapshot of operational data measurements at any interval that enables remote monitoring unit 44 to function as described herein.

Remote monitoring unit 44 determines at 304 whether gas turbine engine 10 is in the correct operating mode. In the exemplary embodiment, this check is to determine whether the rotor speed is greater than 50% of the gas turbine engine 10 operating speed. This setting enables for increased coverage of the operating range of compressor 12, as there should be little time spent below 50% while there is flame in the unit. Alternatively, the correct operating mode of gas turbine engine 10 may be higher or lower than 50%, based on the specific operating parameters of different gas turbine engines. Further, in one suitable embodiment, remote monitoring unit 44 compares the snapshot of operational data measurements to one or more threshold levels in a table of threshold levels to determine whether gas turbine engine 10 is in the correct operating mode. If remote monitoring unit 44 determines that gas turbine engine 10 is not in the correct operating mode, then no further action is taken at 306.

If it is determined at 304 that gas turbine engine 10 is in the correct operating mode, then remote monitoring unit 44 will perform data quality and out-of-range sensor checks at 308. These checks are important to minimize alarms that do not provide any value to downstream customers. For any number of reasons, data quality can be poor such that the measurements should not be used, e.g., data connections between controller 18 and OSM 26 may be broken, misconfigured tags, etc. In addition, the data can be present, but the measured values may not be reasonable. For example, CPD can drop to a real value of zero while gas turbine engine 10 is online. This data is filtered out and not considered in downstream analysis by remote monitoring unit 44. Based on the data quality check, remote monitoring unit 44 determines whether sensors 28, 30, 32, 34, and 42 are bad or have failed at 310. Generally, a sensor will be considered to be bad or have failed if the measurements are not reasonable as determined by the data quality check operation. If remote monitoring unit 44 determines that any of sensors 28, 30, 32, 34, and 42 are bad or have failed, then any measurements that they have generated are ignored at 312.

Processing of sensor 28, 30, 32, and 34 measurements and operational sensors 42 measurements continues at 314 where remote monitoring unit 44 looks for certain conditions to be true. In the exemplary embodiment, remote monitoring unit 44 compares measurements from sensors 28, 30, 32, and 34 and operational sensors 42 measurements over a predetermined period (for example, data is received at predetermined periodic interval). Alternatively, remote monitoring unit 44 can compare sensor measurements received at any interval over any period that enables remote monitoring unit 44 to function as described herein.

In the exemplary embodiment, remote monitoring unit 44 compares gas turbine engine 10 exhaust conditions, compressor exit conditions, and compressor inlet conditions to determine whether a surge event as happened. For example, in one embodiment, remote monitoring unit 44 substantially simultaneously compares mean exhaust temperature changes to determine whether the mean exhaust temperature has increased a predetermined amount, compressor discharge pressure changes to determine whether compressor discharge pressure has decreased a predetermined amount, inlet bellmouth static pressure changes to determine whether the inlet bellmouth static pressure has decreased a predetermined amount, and the inlet pressure drop across the filter to determine whether the inlet pressure drop has decreased a predetermined amount. At 316, if both the mean exhaust temperature and the compressor discharge pressure changes meet a predetermined threshold and either the inlet bellmouth static pressure or the inlet pressure drop across the filter changes also meet a predetermined threshold, then at 318 remote monitoring unit 44 generates an escalation alarm indicating that surge has occurred in gas turbine engine 10. If the conditions are not met, then remote monitoring unit 44 executes operation 320.

At 320, remote monitoring unit 44 simultaneously performs a separate comparison to determine if the compressor discharge pressure has decreased or increased a predetermined amount over a predetermined period. This check is used to determine whether a surge event has occurred in gas turbine engine 10 in an instance where compressor 12 has recovered, whereas operation 316 is used in instances where compressor 12 has not recovered. If at 320 the compressor discharge pressure has dropped or increased the predetermined amount, remote monitoring unit 44 generates an escalation alarm at 318 indicating that surge has occurred in gas turbine engine 10. If the condition is not met, then no further action is taken at 322.

The foregoing flow chart shows some of the processing operations associated with detecting surge in gas turbine engine 10. In this regard, each block represents a process act associated with performing these operations. It should be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing operations may be added.

In the various embodiments of the present disclosure, portions of the processing operations performed remote monitoring unit 44 can be implemented in the form of an entirely hardware embodiment, an entirely software embodiment, or an embodiment containing both hardware and software elements. In one embodiment, the processing functions performed remote monitoring unit 44 may be implemented in software, which includes but is not limited to firmware, resident software, microcode, etc.

Furthermore, the processing functions performed by remote monitoring unit 44 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Those skilled in the art will recognize that it may be possible to implement some of the functionality performed by remote monitoring unit 44 in OSM 26, such that OSM 26 is able to process the operational measurements into a snapshot, determine the presence of surge events in gas turbine engine 10, and generate an escalation alarm indicating that surge has occurred.

Although the description heretofore has been directed to determining surge events from one gas turbine engine, those skilled in the art will recognize that the various embodiments of the present invention are suitable for monitoring the operation with multiple gas turbine engines at one particular site, and even is suitable for monitoring the operation of multiple gas turbine engines located in multiple locations. For example, in a site where there is more than one gas turbine engine 10, OSM 26 would be coupled to each of these gas turbine engines and would receive the various measurements (operational measurements, speed measurements, etc.). In such a scenario, OSM 26 would continually transmit the data snapshot from the various gas turbine engines located at the site to remote monitoring unit 44 via communications network 46 for analysis to determine the presence of a potential surge event.

The systems and methods described herein facilitate remotely detecting surge events in a fleet of gas turbine engines. Specifically, an on-site monitoring (OSM) system is configured to transmit certain operational parameter data to a remote monitoring unit for further processing to determine whether a surge event has occurred in the gas turbine engine. The OSM system is configured to use the gas turbine engine's existing sensors to acquire the necessary operational parameter data required to determine whether a surge event has occurred. Therefore, in contrast to known gas turbine engines that use local controllers and additional sensors to determine whether surge is occurring, the apparatus, systems, and methods described herein facilitate enabling the monitoring of a fleet of turbine engines to be implemented with reduced cost, and enabling rapid changes to the surge detection algorithm if necessary to increase accuracy.

An exemplary technical effect of the methods and systems described herein includes at least one of: (a) remotely receiving the operating parameters of a gas turbine engine from an on-site monitoring device; (b) determining whether surge has occurred in the gas turbine engine; and (c) alerting an operator of the gas turbine engine that surge has occurred based on the operating parameters received.

The methods and systems described herein are not limited to the specific embodiments described herein. For example, components of each system and/or steps of each method may be utilized independently and separately from other components and/or steps described herein. For example, the method and systems may also be used in combination with other turbine systems, and are not limited to practice only with the gas turbine engines as described herein. Rather, the exemplary embodiment can be implemented and utilized in connection with many other turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A system for remote detection of surge in a fleet of turbine engines, said system comprising:
    an on-site monitoring device coupled to each turbine engine of the fleet of turbine engines, said on-site monitoring device configured to continuously receive operating parameter measurements indicative of operational and thermodynamic conditions of the turbine engine, wherein said operational condition comprises a compressor exit condition of the turbine engine compressor, said on-site monitoring device further configured to compile and transmit a snapshot of said operating parameter measurements to a remote monitoring unit;

a remote monitoring unit remote from each turbine engine of the fleet of turbine engines, said remote monitoring unit configured to receive said snapshot of said operating parameter measurements from said on-site monitoring device, said remote monitoring unit further configured to detect surge in the turbine engine based on said snapshot of said operating parameter measurements; and a plurality of sensors configured to transmit the operating parameter measurements to said on-site monitoring device, wherein said remote monitoring unit performs data quality and out-of-range sensor checks on said snapshot of the operating parameter measurements to determine if said plurality of sensors are operating properly.

2. The system in accordance with claim 1, wherein said remote monitoring unit performs an operating mode check to determine if the turbine engine is in a correct operating mode for determining compressor surge.

3. The system in accordance with claim 1, wherein said on-site monitoring device analyzes said snapshot of said operating parameter measurements to determine if said operating parameter measurements are indicative of turbine engine surge.

4. The system in accordance with claim 1, wherein said plurality of sensors comprises one or more of the following: pressure sensors, temperature sensors, and flame detector sensors.

5. The system in accordance with claim 1, wherein said remote monitoring unit analyzes said snapshot of said operating parameter measurements to determine if said operating parameter measurements are indicative of turbine engine surge.

6. The system in accordance with claim 5, wherein said remote monitoring unit analyzes said snapshot of said operating parameter measurements to determine if said compressor exit condition has exceeded a predetermined threshold over a predetermined period, said remote monitoring unit generating an escalation alarm indicating the presence of turbine engine surge in response to determining that said compressor exit condition has exceeded the predetermined threshold over the predetermined period.

7. The system in accordance with claim 5, wherein said operational condition further comprises a compressor inlet condition of the turbine engine compressor and said thermodynamic condition comprises an exhaust condition of the turbine engine.

8. The system in accordance with claim 7, wherein said remote monitoring unit analyzes said snapshot of said operating parameter measurements to determine if said compressor exit condition has exceeded a predetermined threshold over a predetermined period and said exhaust condition has exceeded a predetermined threshold over the predetermined period.

9. The system in accordance with claim 8, wherein said remote monitoring unit further analyzes said snapshot of said operating parameter measurements to determine if said compressor inlet condition has exceeded a predetermined threshold over the predetermined period, said remote monitoring unit generating an escalation alarm indicating the presence of turbine engine surge in response to determining that said compressor exit condition, said exhaust condition, and said compressor inlet condition has exceeded the predetermined thresholds over the predetermined period.

10. A method for remote detection of surge in a fleet of turbine engines, said method comprising:

monitoring operating parameters with a plurality of sensors coupled to each turbine engine of the fleet of turbine engines, the operating parameters indicative of an operational condition and a thermodynamic condition of each turbine engine of the fleet of turbine engines, the operational condition including a compressor exit condition;

continuously transmitting, to an on-site monitoring device, operating parameter measurements representative of the operational condition;

compiling the operating parameter measurements into a periodic snapshot of the operating parameter measurements;

transmitting, to a remote monitoring unit, the snapshot of operating parameter measurements;

performing a data quality and out-of-range sensor check on the snapshot of operating parameter measurements to determine if the plurality of sensors are operating properly; and detecting surge in each turbine engine of the fleet of turbine engines based on the snapshot of operating parameter measurements.

11. The method in accordance with claim 10 further comprising storing the snapshot of operating parameter measurements in a database containing historical snapshots of operating parameter measurements obtained from each turbine engine.

12. The method in accordance with claim 10 further comprising determining if each turbine engine of the fleet of turbine engines is in a correct operating mode for determining compressor surge.

13. The method in accordance with claim 12, wherein determining if each turbine engine of the fleet of turbine engines is in a correct operating mode comprises comparing the snapshot of operating parameter measurements to one or more threshold levels in a table of threshold levels.

14. The method in accordance with claim 10, wherein detecting surge in each turbine engine comprises analyzing the snapshot of operating parameter measurements to determine if the operating parameter measurements are indicative of turbine engine surge.

15. The method in accordance with claim 14, wherein analyzing the snapshot of operating parameter measurements comprises analyzing the snapshot of operating parameter measurements using the on-site monitoring device to determine if the operating parameter measurements are indicative of turbine engine surge.

16. The method in accordance with claim 14, wherein analyzing the snapshot of operating parameter measurements comprises determining if the compressor exit condition has exceeded a predetermined threshold over a predetermined period.

17. The method in accordance with claim 16 further comprising generating an escalation alarm indicating the presence of turbine engine surge in response to determining that said compressor exit condition has exceeded the predetermined threshold over the predetermined period.

18. The method in accordance with claim 14, wherein analyzing the snapshot of operating parameter measurements further comprises determining if the compressor exit condition has exceeded a predetermined threshold over a predetermined period and the exhaust condition has exceeded a predetermined threshold over the predetermined period, wherein the operational condition further includes a compressor inlet condition of the turbine engine compressor and the thermodynamic condition includes an exhaust condition of the turbine engine.

19. The method in accordance with claim 18, further comprising determining if the compressor inlet condition has exceeded a predetermined threshold over the predetermined period.

20. The method in accordance with claim 19 further comprising generating an escalation alarm indicating the presence of turbine engine surge in response to determining that the compressor exit condition, the exhaust condition, and the compressor inlet condition has exceeded the predetermined thresholds over the predetermined period.

* * * * *